April 20, 1937.  J. L. BAIRLEY  2,077,386

CLAMP FOR CABLES, WIRES, ROPES, AND THE LIKE

Original Filed May 6, 1935

INVENTOR.
JOHN L. BAIRLEY
BY
ATTORNEY

Patented Apr. 20, 1937

2,077,386

UNITED STATES PATENT OFFICE 2,077,386

CLAMP FOR CABLES, WIRES, ROPES, AND THE LIKE

John L. Bairley, Murphys, Calif.

Application May 6, 1935, Serial No. 20,026
Renewed July 6, 1936

3 Claims. (Cl. 24—136)

This invention relates particularly to a clamp for clamping together the overlapping ends of a cable, wire or rope, or to hold the strands of a cable, etc., together, to form an eyelet, or for clamping the ends of contiguous cables, wires or ropes, together into axial alignment.

An object of the invention is to provide a clamp for cables, wires, ropes and the like, by means of which two strands of the cable, wire, or rope may be clamped together against axial dislodgement, whereby any force tending to axially separate the two strands will have the effect of causing the clamp to increase the application of frictional resistance as well as compressive action on the said strands.

A further object of the invention is to provide a two part clamp for holding a pair of cables, wires, ropes or the like, together, so that one of the cables, wires, ropes or the like may not move axially relative to the other, which, said clamp, may readily be loosened to free the clamp parts.

A still further object of the invention is to provide a clamp to be used in clamping or securing a pair of cables, wires or ropes together, which clamp is of the automatic self-locking type, wherein the pressure exerted by the clamp on the parts to be clamped together is directly proportionate to the force or pull tending to axially dislodge the clamp members.

Other objects and advantages are to provide a clamp for cables, wires, ropes and the like that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
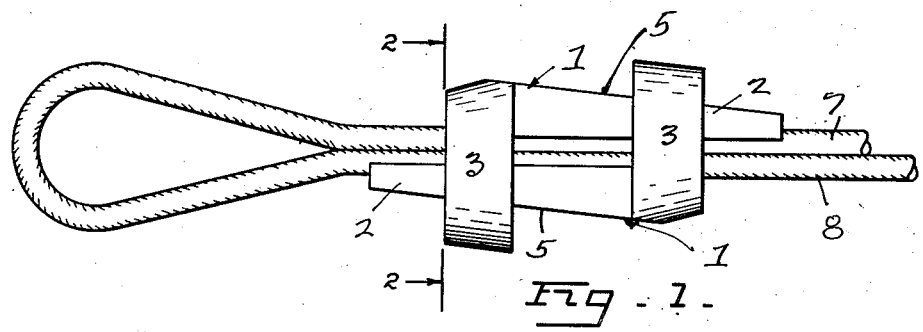
Fig. 1 is a side elevation of an automatic self-locking clamp constructed in accordance with my invention, and illustrating the application thereof in clamping position on a pair of overlapping circular strands.
Figures 2, 3:
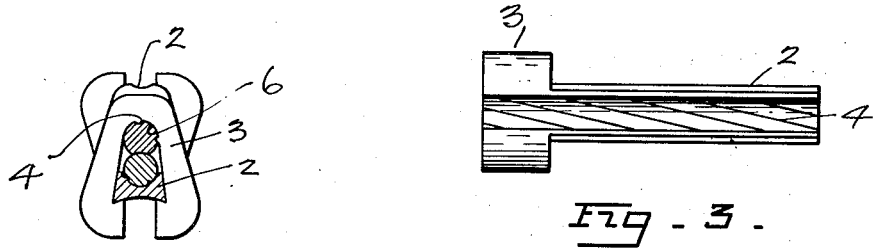
Fig. 2 is a cross section taken through Fig. 1 on the line 2—2.
Fig. 3 is a plan view of one of the clamp members.

In detail the construction illustrated in the drawing comprises a pair of clamping members I—I, both of which are exactly alike as to size, shape and configuration. Each clamp member consists of an elongated, tapered tongue piece 2, having a cowl housing or saddle 3 projected outwardly on one side of an end thereof. A groove or channel 4 is provided on the upper face of the tongue 2, which groove or channel extends lengthwise of the tongue piece and through that portion of the tongue which is confined within the housing 3.

The under or bottom face 5 of the tongue piece 2 is tapered longitudinally and does not lie parallel with the upper surface of the tongue piece. In order to hold two overlapping strands of a cable, wire, or rope together by means of the clamp constructed in accordance with my invention, the two strands of the members to be clamped together are inserted through the housings or saddles 3 in each of the members I—I. One of said members is placed in an upside down and reversed position relative to the other, whereby the tapered bottom faces 5 of each of the tongue pieces will engage the tapered inside portion 6 on the housing of the other member. The grooved inner faces of each of the tongue pieces engage the outer circumference of the strands 7 and 8 to hold the said strands in superposed position.

When the clamp members I—I are engaged in the position shown in Fig. 1, they are initially engaged with the strands 7 and 8 by driving the tongue piece 3 on the respective clamps toward each other, the tapered engaging surfaces on the tongue pieces and housings serving to move the inner parallel faces of the tongue pieces closer together, and thereby tightly clamping the strands 7 and 8. Any force tending to pull the strands 7 and 8 axially apart, would have the effect of more tightly pulling the tongue pieces 2 into clamping engagement, on account of the frictional resistance resulting between the contact of the strands 7 and 8 with the inner faces of the tongue pieces. When the two clamps I—I are engaged in the manner shown in Fig. 1, the degree of clamping resistance to be exerted on the strands 7 and 8 by the tongue pieces of the clamp, is directly proportional to the force or pull tending to axially dislodge the said strands. The action of the two clamping members to engage with the strands 7 and 8 is automatic and self-locking in character, yet two parts of the clamp may be readily disengaged in order to free the strands 7 and 8 from the clamp.

The under or bottom face of the tongue piece 2 has a concave curvature on the lateral dimension to engage a complemental convex seat in the saddle 3 of the other part of the clamp with which it is embedded. The cowl housing or saddle 3 on the side thereof opposite the tongue piece 2 is slotted in the longitudinal direction to thereby facilitate a realtively quick engagement or disengagement of the respective halves of the clamp. The cross sectional area of the saddle 3 is designed to compensate the maximum of pressures and forces to which it may be subjected in operation.

Figures 4, 6:
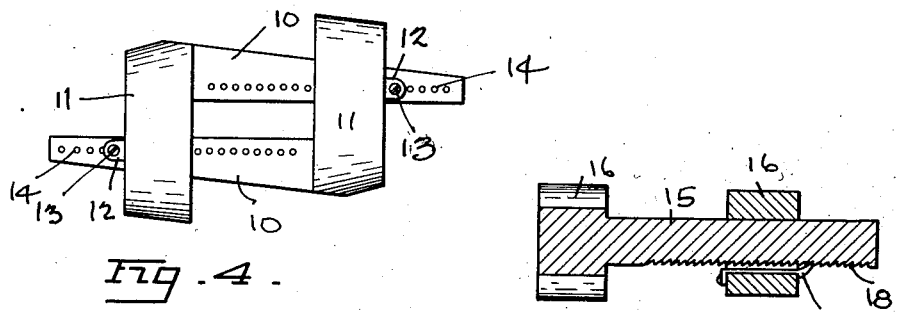
Fig. 4 is a side elevation of a modified form of clamping device having means thereon for frictionally locking the respective parts of the device.
Fig. 6 is a plan section taken through Fig. 5 on the line 6—6.

In the form of clamping device shown in Fig. 4, I have provided a tongue piece 10 and saddle 11 on an end thereof, both the tongue piece and saddle being substantially the same in form and configuration as the tongue piece and saddle shown in the preferred form of the invention. The overlapping ends of the cable, etc., would be confined between the embedded parts of the clamp and held therebetween by exactly the same process as that followed in the preferred form of the invention. However, in the modified form of the device, I provide a projection 12 on the rear end of each housing 11, and in which projection 12 a bolt or screw 13 is threadedly mounted, whereby said bolt or screw may be engaged with any selected tapped hole 14 along the side of the tongue piece 10 which is confined in the housing 11. By thus engaging the screw or bolt 13 with a selected tapped hole, longitudinal disarrangement of the meeting halves of the clamp is prevented and it is thus possible to lock the respective halves of the clamp in a fixed position in relation to each other.

Figure 5:
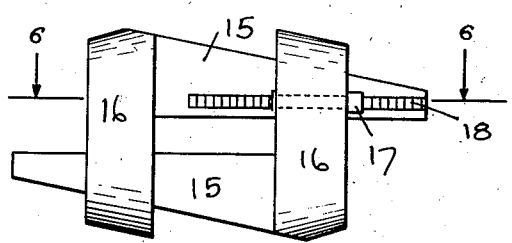
Fig. 5 is a side elevation of a modified form of clamping device having means thereon for automatically and fixedly locking together the respective parts of the device.

In the modified form of the invention shown in Figs. 5 and 6, I provide a pair of clamping members each of which are complemental and are adapted to be telescoped or nested in the same manner as the preferred form of the invention shown in Fig. 1.

In Figs. 5 and 6 I have provided a tongue piece 15 having a housing 16 on one end thereof, and the said tongue piece and housing have the same shape and configuration as do the tongue piece and housing in the preferred form of the invention. In this modified form of the invention, I have interposed an automatic locking device between meeting portions of the clamp, whereby when the respective halves of the clamp are engaged they will be automatically locked together in a relatively fixed position. In order to accomplish this automatic locking action I have provided a spring latch 17 within the saddle 16 of one part of the clamp and along a face thereof directly adjacent a side of the tongue piece 15 of the opposite half of the clamp, said tongue piece being contiguous to the spring latch 17 and having a ratchet or toothed portion 18 thereon. The latch 17 is provided with a curvature throughout, which will normally cause it to extend outwardly within the interior of the housing and thus always remain in frictional contact with the face of the tongue piece 15 directly adjacent thereto. Thus as the tongue piece 15 is telescoped within the housing 16, the latch 17 engages the toothed portion thereon, and holds the respective parts of the clamp together in any selected fixed position in which they may be engaged.

Having thus described this invention, what I claim and desire to secure by Letters Patent is:

1. A clamp of the character described comprising a pair of like members each having a longitudinally disposed groove in the interior thereof, said members being spaced from each other and adapted when in operative relationship to mutually form a longitudinal parallel and transversely elliptical seat for the overlapping ends of a pair of cables, ropes or the like, each member having the exterior thereof tapered longitudinally; and a hollow housing projecting outwardly on the grooved side of each member adjacent an end thereof, the interior of each housing being tapered to receive the tapered exterior of the other member and operating when said members are advanced axially toward each other to decrease the area of the elliptical seat and to increase the area of said elliptical seat when the members withdrawn axially from each other, and each housing having a longitudinally disposed slot cut therethrough on the side thereof opposite the member of which said housing is a part.

2. A clamp of the character described comprising a pair of like members each having a longitudinally disposed groove in the interior thereof, said members being spaced from each other and adapted when in operative relationship, to mutually form a longitudinal parallel and transversely elliptical seat for the overlapping ends of a pair of cables, ropes or the like, each member having the exterior thereof tapered longitudinally; a hollow housing projecting outwardly on the grooved side of each member adjacent an end thereof, the interior of each housing being tapered to receive the tapered exterior of the other member and operating when said members are advanced axially toward each other to decrease the area of the elliptical seat and to increase the area of said elliptical seat when the members are withdrawn axially from each other, and each housing having a longitudinally disposed slot cut therethrough on the side thereof opposite the member of which said housing is a part; and means on each housing adapted for co-engagement with each member to prevent axial movement of one member relative to the housing of the other member.

3. A clamp of the character described comprising a pair of like members each having a longitudinally disposed groove in the interior thereof, said members being spaced from each other and adapted when in operative relationship to mutually form a longitudinal parallel and transversely elliptical seat for the overlapping ends of a pair of cables, ropes or the like, each member having the exterior thereof tapered longitudinally; a hollow housing projecting outwardly on the grooved side of each member adjacent an end thereof, the interior of each housing being tapered to receive the tapered exterior of the other member and operating when said members are advanced axially toward each other to decrease the area of the elliptical seat and to increase the area of said elliptical seat when the members are withdrawn axially from each other, and each housing having a longitudinally disposed slot cut therethrough on the side thereof opposite the member of which said housing is a part; a rack disposed longitudinally on each member; and a spring latch on each housing whereby the spring latch on one housing will engage the rack on the member nested within said housing to prevent displacement of one member away from the housing of the other member.

JOHN L. BAIRLEY.